(12) United States Patent
Lum

(10) Patent No.: US 7,604,217 B2
(45) Date of Patent: Oct. 20, 2009

(54) ELECTROLYSIS-RESISTANT COUPLING ASSEMBLY FOR VALVES

(75) Inventor: Ken Lum, Fresno, CA (US)

(73) Assignee: Grundfos Pumps Corporation, Olathe, KS (US)

( * ) Notice: Subject to any disclaimer, the term of this patent is extended or adjusted under 35 U.S.C. 154(b) by 34 days.

(21) Appl. No.: 11/246,991

(22) Filed: Oct. 7, 2005

(65) Prior Publication Data

US 2007/0080310 A1  Apr. 12, 2007

(51) Int. Cl.
*F16K 51/00* (2006.01)
*F16L 29/00* (2006.01)

(52) U.S. Cl. .......... 251/148; 251/153; 251/315.01; 251/368; 285/368; 285/412

(58) Field of Classification Search .......... 251/148, 251/152, 153, 315.01–315.16, 368; 285/368, 285/412, 414
See application file for complete search history.

(56) References Cited

U.S. PATENT DOCUMENTS

| | | | | |
|---|---|---|---|---|
| 2,033,122 A * | 3/1936 | Cornell, Jr. | ............. | 228/246 |
| 2,653,834 A * | 9/1953 | Purkhiser | ............. | 285/50 |
| 3,404,902 A * | 10/1968 | Bollfrass et al. | ............. | 285/14 |
| 3,744,755 A * | 7/1973 | Gary et al. | ............. | 251/309 |
| 4,089,345 A * | 5/1978 | Eberhardt | ............. | 137/596.2 |
| 4,702,500 A * | 10/1987 | Thau et al. | ............. | 285/112 |
| 4,767,138 A * | 8/1988 | Schafbuch | ............. | 285/368 |
| 6,158,782 A * | 12/2000 | Stanley et al. | ............. | 285/50 |
| 6,276,726 B1 * | 8/2001 | Daspit | ............. | 285/15 |
| 6,299,127 B1 * | 10/2001 | Wilson | ............. | 251/38 |
| 6,299,219 B1 * | 10/2001 | Hoegger | ............. | 285/190 |
| 6,575,429 B2 * | 6/2003 | Paine | ............. | 251/148 |
| 6,715,802 B2 * | 4/2004 | Baker | ............. | 285/368 |
| 6,935,613 B1 * | 8/2005 | Ward | ............. | 251/148 |

* cited by examiner

*Primary Examiner*—John K Fristoe, Jr.
(74) *Attorney, Agent, or Firm*—The Small Patent Law Group; Dean D. Small; Jay J. Hoette

(57) ABSTRACT

An electrolysis-resistant coupling assembly for a valve within a fluid line. A line flange within the line includes a first mating surface and a fluid passageway therethrough. A valve flange downstream from the line flange includes a second mating surface. The valve flange has an aperture passing therethrough with first and second bores forming a lip. A valve coupler has an upstream end provided with a coupler flange having a third bore. A substantially non-compressible, non-metallic captive ring is interposed between the lip, and the flange and body of the valve coupler. Bolts and nuts assemble the valve flange to the line flange with a gasket therebetween, compressing the lip against the captive ring and the coupler flange. The valve is either sweat fitted or threadably attached to the downstream end of the valve coupler. Various configurations for the valve flange, the captive ring, and the valve coupler are disclosed.

26 Claims, 4 Drawing Sheets

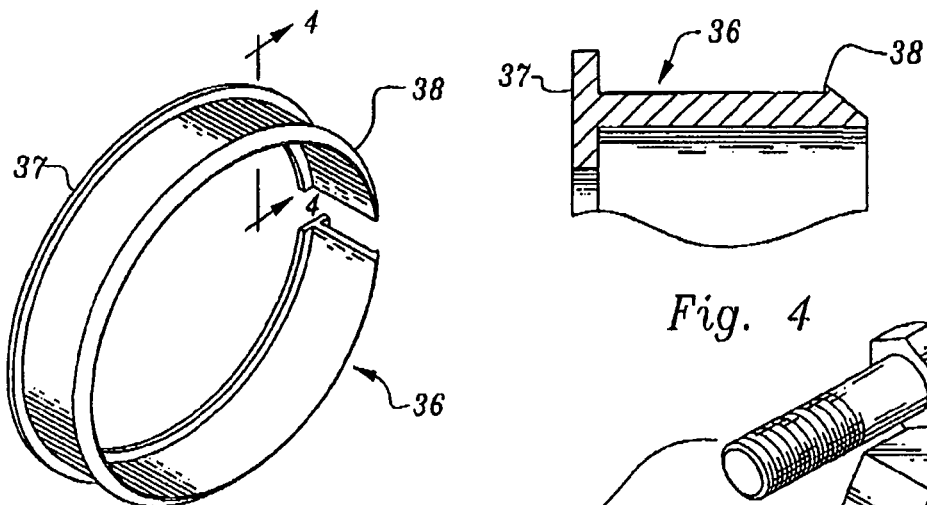
Fig. 4
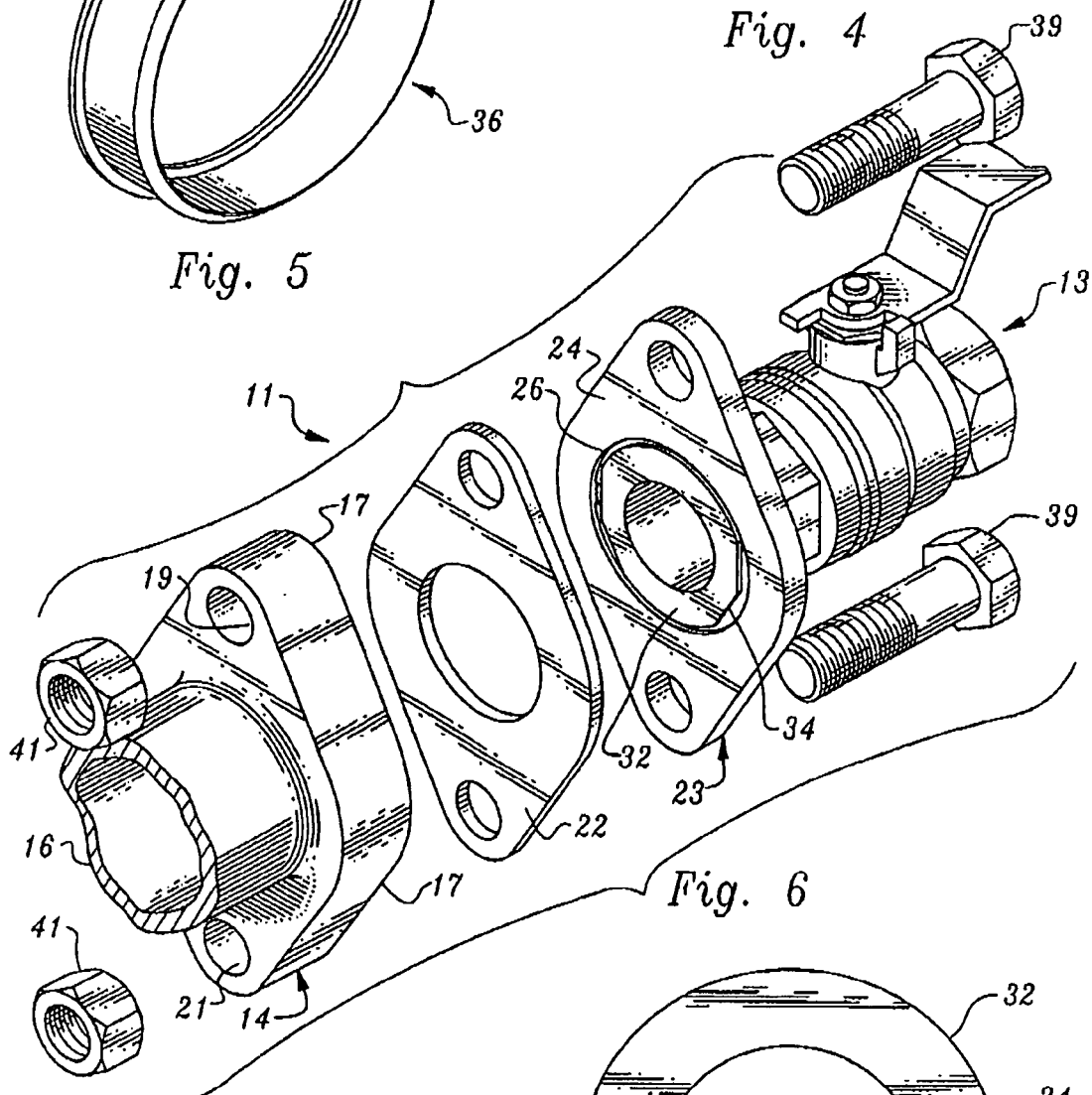
Fig. 5
Fig. 6
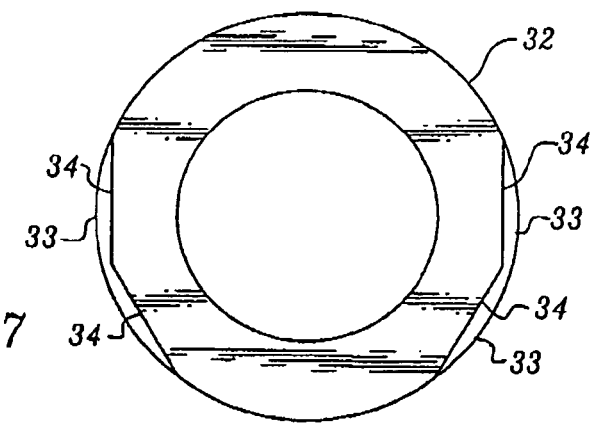
Fig. 7

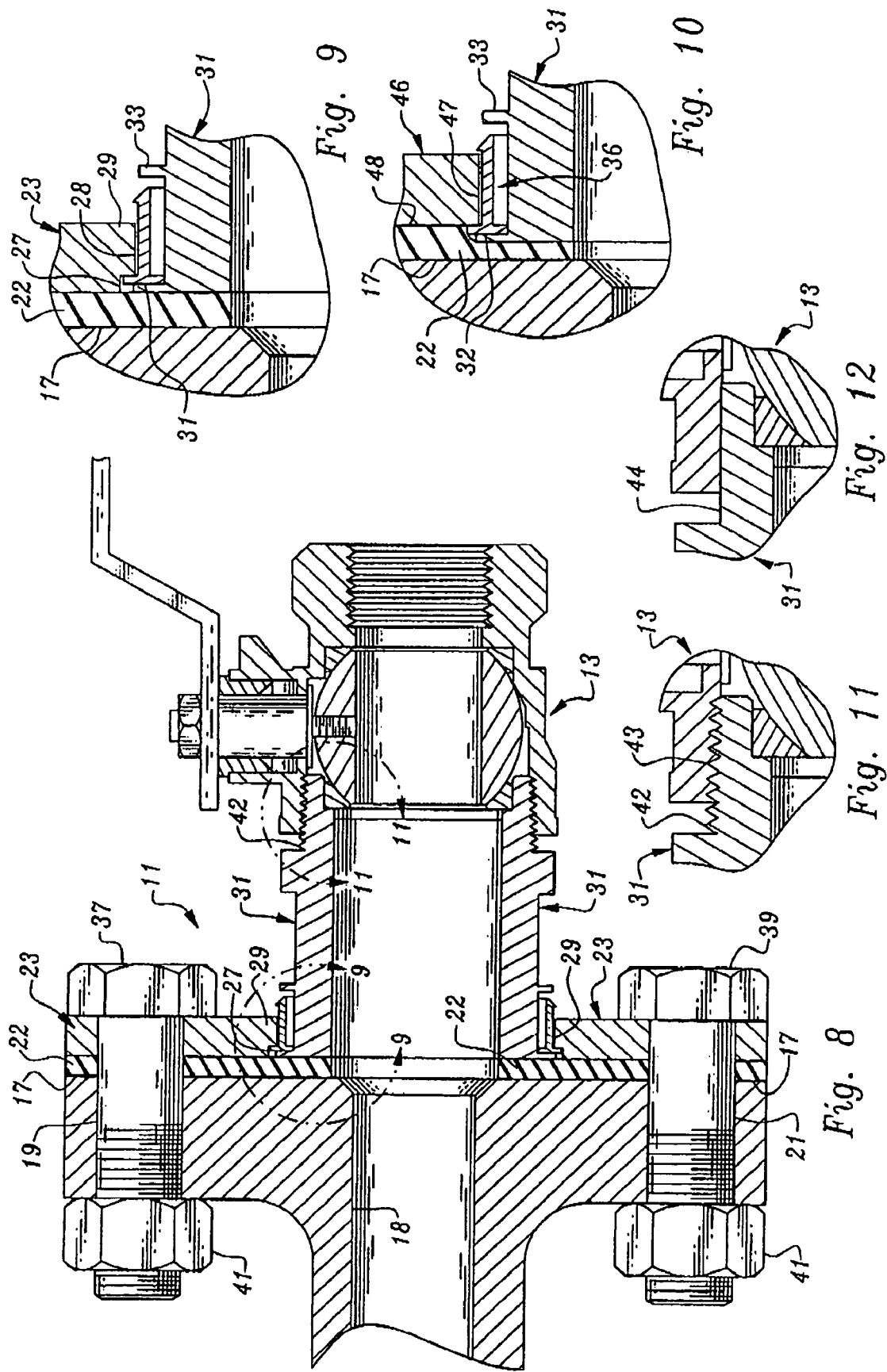

ELECTROLYSIS-RESISTANT COUPLING ASSEMBLY FOR VALVES

BACKGROUND OF THE INVENTION

The invention relates generally to dielectric couplers installed in fluid lines to inhibit corrosion and wasting of two interconnected fluid conduits, made of dissimilar metals. More particularly, the invention pertains to an electrolysis-resistant coupling assembly for valves installed within fluid lines, for isolation or flow control.

Fluid pumps are often provided with a valve either on their inlet line or their outlet line, to provide flow control or fluid isolation. The valve assembly is typically manufactured from copper material. The pump inlet or outlet line, on the other hand, is usually a galvanized steel pipe. Owing to the destructive electrolysis which occurs when these two dissimilar metals are mechanically and electrically interconnected, a dielectric coupler is provided between the pump and the valve. The dielectric coupler allows the pump and the valve to be mechanically and hydraulically interconnected, but electrically isolated.

A conventional dielectric coupler for the valve application includes two components, a pump flange and a mating flange. The pump flange is connected to the galvanized pump line. The mating flange is connected a plumbing fitting which is either soldered to or threaded upon the connector to the valve. Bolts and nuts are used to secure the two flanges together. To provide electrical isolation between the two flanges, a rubber gasket and insulating bolt and nut sleeves are provided. The rubber gasket isolates the interface region between the opposing faces of the flanges. The dielectric sleeves electrically isolate the nuts and bolts from both of the flanges, while allowing a mechanical interconnection to exist between them.

The disadvantages of this construction arise during service of the pump, for example, where removal of the pump is necessary. The working space between the components is such that entire disassembly of the dielectric coupler is required to remove the pump. And this process must be performed in reverse after the pump is repaired.

BRIEF DESCRIPTION OF THE INVENTION

The apparatus disclosed herein is an electrolysis-resistant coupling assembly for use with an isolation or flow control valve positioned along a fluid line. A typical application for such a valve would be upstream from the inlet to a pump, or downstream from the output of a pump.

A generally circular line flange has means on one side for coupling to the fluid line. On the other side, the line flange includes a first mating surface, planar in configuration. And, a fluid passageway is provided, extending entirely through the line flange. A plurality of bolt holes are provided around the fluid passageway, to facilitate the connection of the line flange to additional fittings and fixtures.

A valve flange, located on the other side of the line flange, includes a second mating surface which is also planar in configuration. The valve flange has a central aperture passing therethrough. The central aperture has a first section with first bore, and a second section with a second bore. The second bore is smaller than the first bore, so that the second section forms a lip with respect to the first section.

A valve coupler has one end provided with an outer coupler flange. The outer coupler flange has a third bore, which is sized between the first bore and the second bore of the central aperture of the valve flange. One embodiment of the invention includes an inner coupler flange in spaced relation from the outer coupler flange. These two coupler flanges form an annular volume extending around the body of the valve coupler. The other end of the valve coupler is adapted for interconnection to a valve. This may be through a sweat fitting or threads. Additionally, the valve coupler includes a fluid passageway, for the transmission of fluid through the coupler from one end to the other end.

A substantially non-compressible, non-metallic captive ring is interposed between the lip of the central aperture, and the flange of the valve coupler. Various configurations for the captive ring are disclosed. In the embodiment of the invention using the inner and outer valve coupler flanges, the captive ring is located between these flanges and between the lip and the valve coupler body.

Bolts and nuts assemble the valve flange to the line flange with a compressible rubber gasket therebetween. When the line flange, the valve flange, valve coupler are so assembled, the lip is compressed tightly against the captive ring and the coupler flange. This forms the dielectric assembly, effectively isolating the valve from the pump line.

Several alternative embodiments of the invention are disclosed, employing different configurations for the valve flange, the captive ring, and the valve coupler. Yet another embodiment provides a dielectric coupling assembly for more general use, such as interconnecting an inlet or outlet water line to a hot water heater.

BRIEF DESCRIPTION OF THE DRAWINGS

FIG. 4 is a cross-sectional view, taken on the line 4-4 in FIG. 5;

FIG. 5 is a perspective view of the split ring, taken to an enlarged scale;

FIG. 6 is an exploded perspective view, showing the assembly of the valve flange, the rubber gasket, the pump flange, the valve coupler and the valve;

FIG. 7 is a front elevational view of the valve coupler, showing the outer coupler flange and the inner coupler flange;

FIG. 8 is a longitudinal, cross-sectional view of the coupling assembly and a valve;

FIG. 9 is a detail inset view, taken on the line 9-9 in FIG. 8;

FIG. 10 is a detail inset view, showing an alternative construction for the pump flange which lacks a lip in its central aperture;

FIG. 11 is a detail inset view, taken on the line 11-11 in FIG. 8, showing a threaded interconnection between the valve coupler and the valve;

FIG. 12 is a detail inset view, showing an alternative sweat interconnection between the valve coupler and the valve;

DETAILED DESCRIPTION OF THE INVENTION

Figure 1:
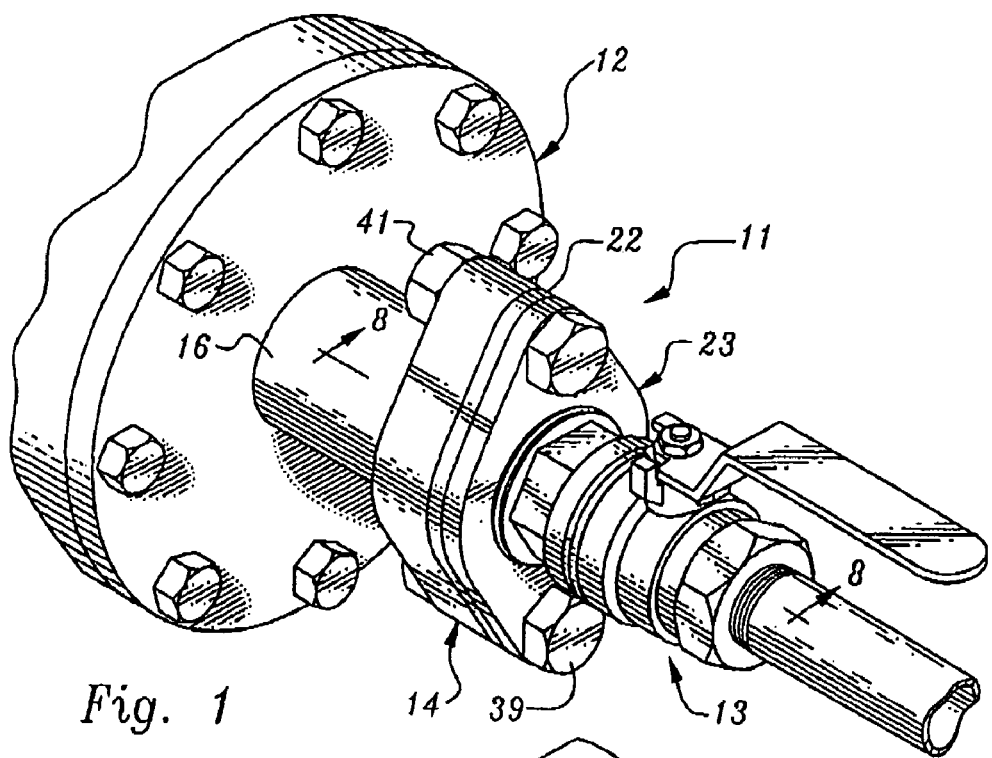
FIG. 1 is a right-front perspective view of a pump, dielectric coupling assembly, and valves formed in accordance with an embodiment of the present invention.
Figure 2:
FIG. 2 is a left-front perspective view of the valve coupler and the valve, with the valve flange being installed over one end of the valve coupler in the manner indicated by the arrows.

Turning now to the drawings, and in particular to FIG. 1, an electrolysis-resistant coupling assembly 11 is shown in combination with a pump 12 and a valve 13. In this particular arrangement, the valve 13 serves either to isolate the pump 12 hydraulically for service, or to control the output flow of the pump. However, the coupling assembly 11 and valve 13 may be located at the input of the pump, or employed at the input or the output of other hydraulic devices.

A line flange 14 is attached to a pump output line 16, which in turn has an upstream end connected to the discharge port of pump 12. Line flange 14 includes a first mating surface 17 and a fluid passageway 18 extending therethrough. Bolt holes 19 and 21 are provided in the upper and lower portions of line flange 14. Located immediately downstream from the line flange 14 and having one surface in contingent relation with first mating surface 17, is a gasket 22. Gasket 22 has a size and configuration very similar to that of first mating surface 17. A non-conductive resilient material, such as rubber, is preferably employed for gasket 22.

A valve flange 23 is located downstream from the gasket 22 and the line flange 14. Valve flange 23 includes a second mating surface 24, substantially identical in size and configuration to that of gasket 22. Valve flange 23 also has a central aperture 26 passing therethrough. Aperture 26 has a larger first bore 27 and a smaller second bore 28, forming a lip 29.

A valve coupler 31 has one upstream end provided with an outer coupler flange 32 and an inner coupler flange 33. Flanges 32 and 33 extend radially outwardly from this upstream end, and are arranged in axially spaced relation thereon. In the embodiment of the invention shown in FIGS. 2, 3, 6, and 7, the outer coupler flange 32 has a non-circular outer periphery with different diametrical measurements. More specifically, flange 32 includes a plurality of flats 34, strategically located on its outer periphery.

Figure 3:
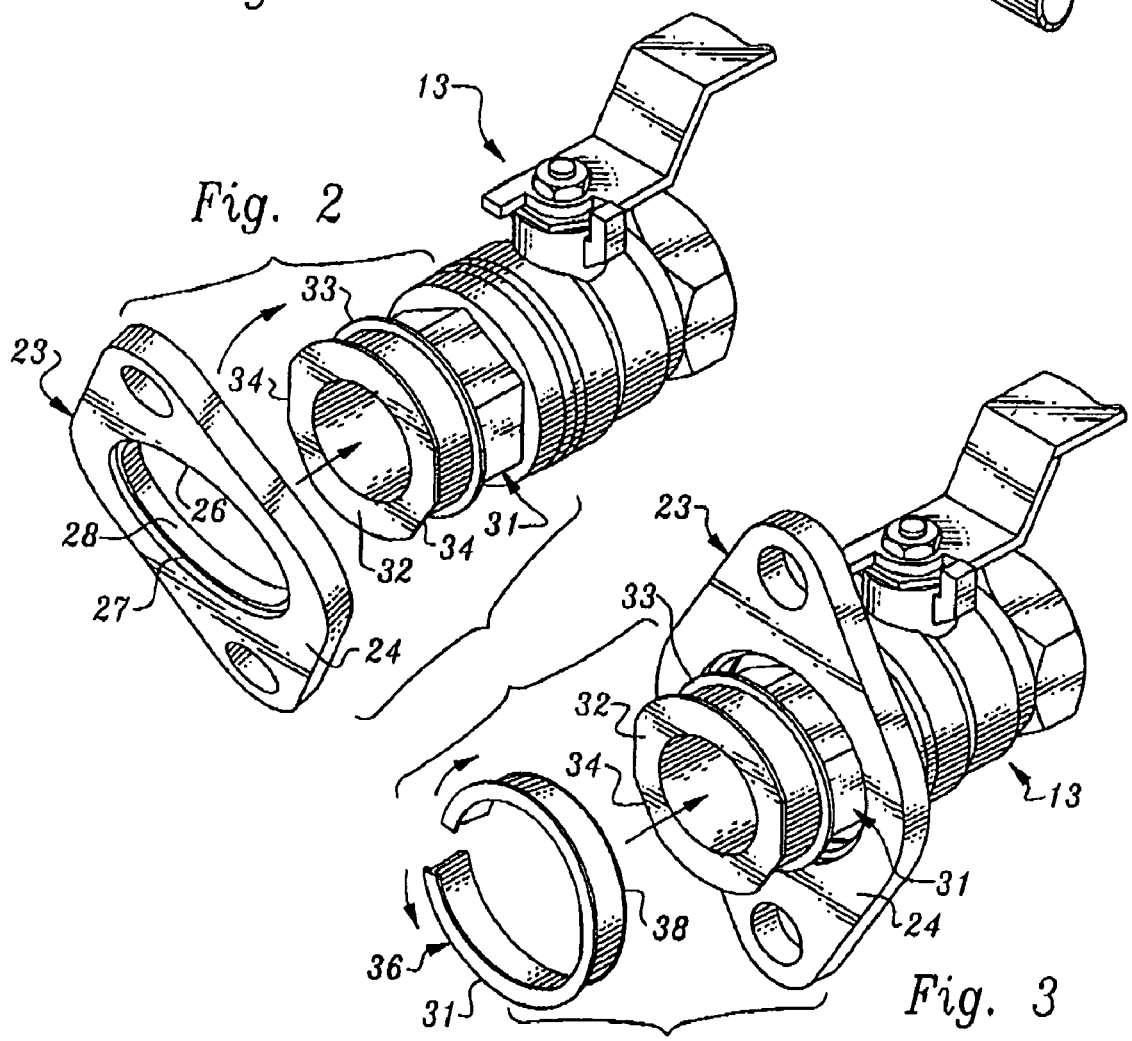
FIG. 3 is a perspective view as in FIG. 2, but with the valve flange installed and the split ring being installed over one end of the valve coupler.

The purpose of flats 34 is to reduce the effective diameter of flange 32 during the assembly of coupling assembly 11. For example, in FIG. 2, valve flange 23 is shown in the process of being installed over flanges 32 and 33. Providing that the axis of valve flange 23 is not coincident with the axis of the valve coupler 31 during this installation process, the presence of the flats 34 facilitates passage of the valve flange 23 over the larger outer coupler flange 32. This is necessary because if coupler flange 32 were perfectly circular, it would be larger than bore 28 and would prevent the installation of valve flange 23. Therefore, following the installation process described above, valve flange 23 is passed over flanges 32 and 33 and is generally located over the body of valve coupler 31, as shown in FIG. 3.

A substantially non-compressible, non-metallic captive ring 36 is then slipped over outer flange 32, to rest within the annular space defined by flanges 32 and 33. Captive ring 36 is manufactured from a material which is resistant to plastic flow under compressive forces. By way of example only, such material would include glass fiber, a hard rubber, or a hard plastic. The inner diameter of ring 36 is smaller than the diameter of outer coupler flange 32. Therefore, captive ring 36 may be split, as shown in FIGS. 3 and 5, to facilitate its installation over outer coupler flange 32.

One configuration for captive ring 36 is generally "T-shaped" in cross-section, as shown particularly in FIG. 4. Thus, after installation of ring 36 between outer coupler flange 32 and inner coupler flange 33, a short top portion 37 of the "T" structure lies against the back face of the outer coupler flange 32. (See, FIGS. 8 and 9). The other side of captive ring 36 is provided with a circumferential retainer barb 38. With ring 36 installed, valve flange 23 is moved upstream, so that it lies generally over ring 36. Retainer barb 38 then holds flange 23 in place over ring 36.

The outer diameter of the ring 36 is greater than the diameters of the bore 28 and the outer coupler flange 32. Thus, when the valve flange 23 is snugged up against the gasket 22 and the line flange 14, the short top portion of the "T" structure is interposed between the lip 29 and the inner face of the outer coupler flange 32. Means to interconnect valve flange 23 and line flange 14 are provided by bolts 39 and nuts 41. By tightening bolts 39 and 41, valve flange 23 is connected to the line flange 14 with gasket 22 therebetween, compressing the lip 29 against the captive ring 36 and the outer coupler flange 32.

External threads 42 are provided around the downstream end of valve coupler 31. Internal threads 43 are provided around the upstream end of valve 13. In this manner, valve 13 is threadably attached to the coupling assembly 11. (See, FIGS. 8 and 11). Alternatively, valve coupler 31 may be provided with a sweat fitting 44, in which case valve 13 may be soldered to coupling assembly 11. (See, FIG. 12).

An alternative construction for the valve flange is shown in FIG. 10. Valve flange 46 is identical to valve flange 23, except it lacks two bores of different diameters and the attendant lip. Rather, flange 46 includes a single diameter bore 47. The diameter of bore 47 is such that it can pass over inner coupler flange 33 but not over the larger outer coupler flange 32. Thus, flange 46 must be installed from the downstream side of valve coupler 31, prior to the time that the valve 13 is installed. In this construction, when the coupling assembly 11 is bolted together, a second mating surface 48 of the flange 46 compresses against the short top portion of the "T" structure of the ring 36. Ring 36, in turn, compresses against outer coupler flange 32 which partially deforms and intrudes inwardly against gasket 22.

Figure 13:
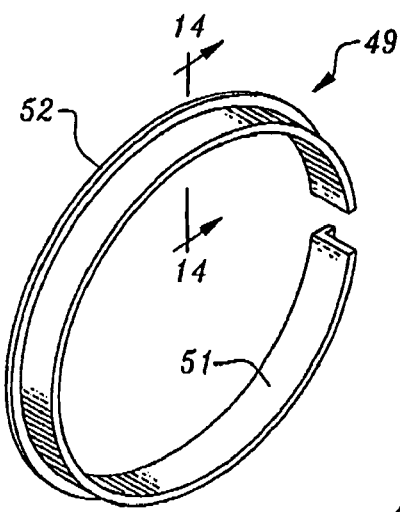
FIG. 13 is a perspective view of an alternative construction for the split ring.
Figure 14:
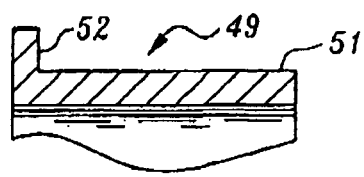
FIG. 14 is a cross-sectional view taken on the line 14-14 in FIG. 13.

Another configuration for the captive ring is shown in FIGS. 13 and 14. Captive ring 49 is "L" shaped in cross-section, having a base portion 51 and a foot portion 52. Captive ring 49 is split in one section, in the same manner and for the same purpose as captive ring 36. Captive ring 49 may be used in connection with the previously discussed valve coupler 31, or with an alternative construction discussed below.

Figure 15:
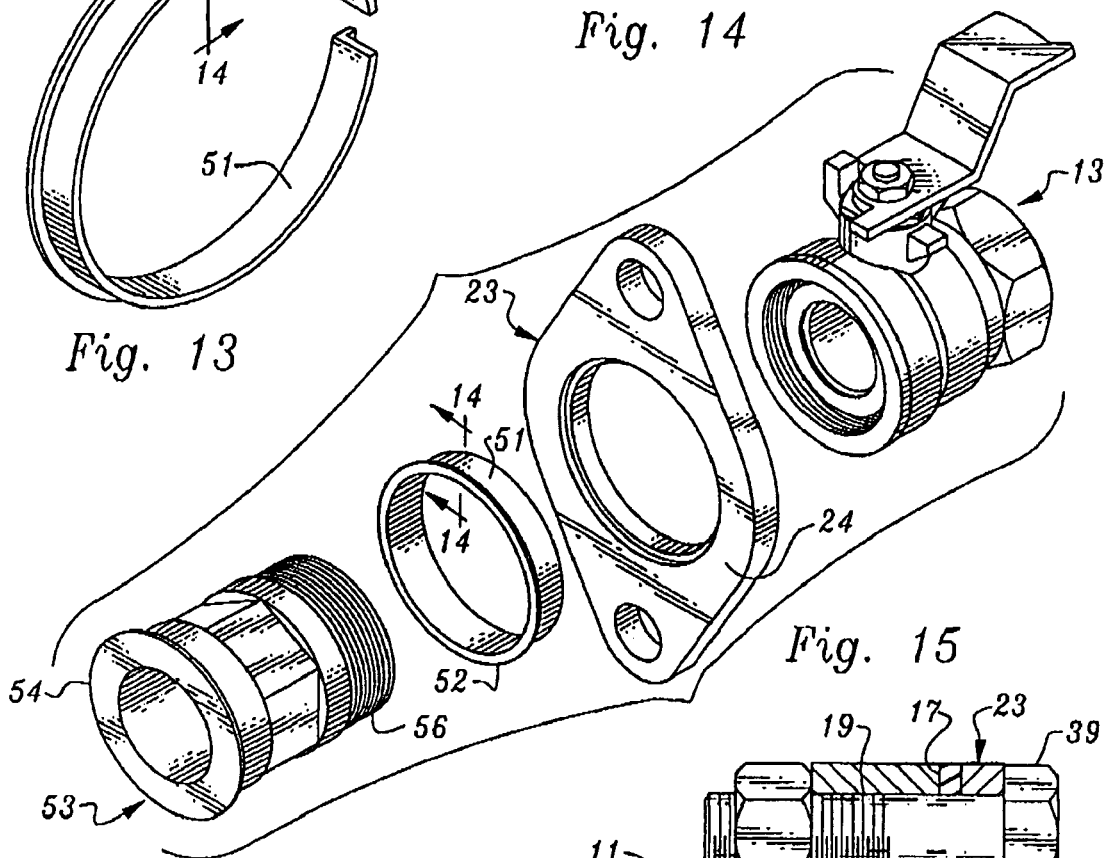
FIG. 15 is an exploded perspective view of an alternative embodiment of the coupling assembly.
Figure 17:
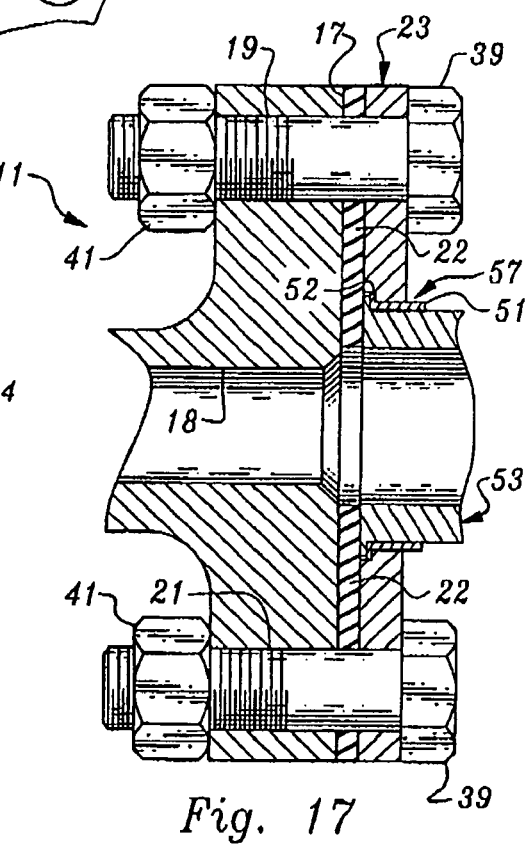
FIG. 17 is a cross-sectional of the alternative embodiment of the coupling assembly shown in FIG. 15.

FIGS. 15 and 17 show alternative constructions both for the captive ring and for the valve coupler employed in the coupling assembly 11. Valve coupler 53 includes a single outer coupler flange 54 on one end, and an externally threaded portion 56 on the other end. Otherwise, valve coupler 53 is identical in features and in function to the previously described valve coupler 31. A captive ring 57 is identical to the previously described captive ring 49, except it is not split. Thus, in the area where cross-sectional views are taken in FIGS. 13 and 15, captive rings 49 and 57 are identical in features.

The inner diameter of captive ring 57 is such that it passes freely over the body of valve coupler 53 from the threaded portion 56 to the rear face of coupler flange 54. Next, valve flange 23 is installed over valve coupler 53, so that it substantially surrounds captive ring 57. In FIG. 17, an assembled coupling assembly 11 incorporating valve coupler 53 and captive ring 57 is shown. As previously explained, bolts 39 and nuts 41 are used to secure the assembly and maintain its components in compressive, sealing relation. A valve 13 is threadably affixed to the threaded portion 56 to complete the system.

Figure 16:
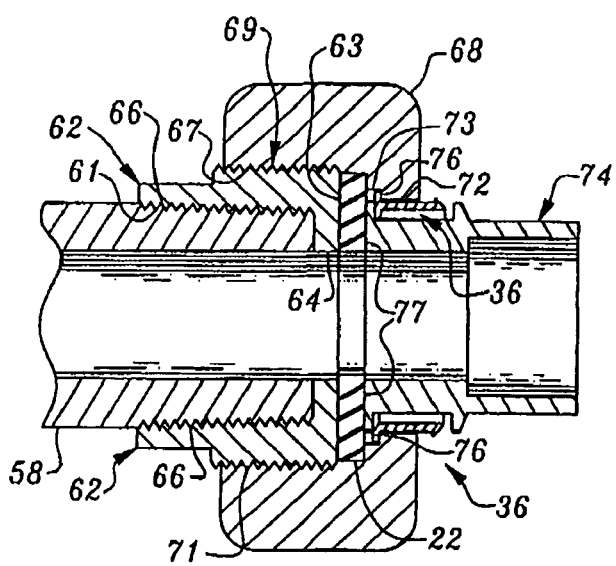
FIG. 16 is a cross-sectional view of an electrolysis-resistant coupling assembly for a fluid line.

Another embodiment of the invention comprises an electrolysis-resistant coupling assembly 58 shown in FIG. 16. Coupling assembly 58 may be used for any application in a fluid line calling for a dielectric coupler. Assembly 58 incorporates many of the features already discussed above, so where common elements are used, the same component numbering scheme will be employed.

Coupling assembly 58 has an inlet line 59 provided with external threads 61, on its downstream end. A line fitting 62, has a first mating surface 63 on one end and a fluid passageway 64 extending therethrough. Line fitting 62 includes inner threads 66 extending inwardly from the other end for coupling to the external threads 61 of the fluid line. Line fitting 62 further includes outer threads 67 extending inwardly over fitting 62, from the first mating surface 63.

Assembly 58 also includes a coupler nut 68 having an aperture 69 extending therethrough. Aperture 69 has inner threads 71 extending inwardly from a first end. Inner threads 71 are adapted for threadably engaging outer threads 67 of line fitting 62. Aperture 69 further includes a lip portion 72, extending inwardly from a second end of coupler nut 68, and a shelf portion 73 between inner threads 71 and lip portion 72.

Assembly 58 further includes a line coupler 74, having an one end provided with a coupler flange 76 having a second mating surface 77. A gasket 22 is provided between and in contingent relation with first mating surface 63 and second mating surface 77. A substantially non-compressible, electrically non-conductive captive ring 36 is provided. Captive ring 36 is interposed between lip portion 72 and coupler flange 76.

In final assembly, coupler nut 68 is rotatably threaded over outer threads 67 of line fitting 62, urging lip portion 72 into compressive relation against captive ring 36 and outer coupler flange 76. The downstream end of line coupler 74 may be threadably or sweat fitted to a downstream line to complete installation of the assembly 58 into a fluid system.

While particular elements, embodiments and applications of the present invention have been shown and described, it will be understood, of course, that the invention is not limited thereto since modifications may be made by those skilled in the art. It is therefore contemplated by the appended claims to cover such modifications that incorporate those features which come within the spirit and scope of the invention.

What is claimed is:

1. An electrolysis-resistant coupling assembly for a valve within a fluid line configured for connection with a line flange, the coupling assembly comprising:
   a valve flange having a first mating surface and having an aperture extending therethrough, wherein said valve flange is configured to be aligned with and face the line flange for coupling thereto;
   a valve coupler having one end provided with an outer coupler flange, said valve flange being loaded onto said valve coupler such that said outer coupler flange passes through said aperture; and
   a substantially non-compressible, electrically non-conductive rigid captive ring, said captive ring being positioned against said outer coupler flange and interposed between said valve flange and said valve coupler to provide electrical separation between said valve flange and said valve coupler; wherein said valve flange is held against said captive ring when said valve flange is interconnected with the line flange.

2. The coupling assembly of claim 1, wherein said aperture in said valve flange includes a first bore and a second bore forming a lip, said captive ring engaging said lip.

3. The coupling assembly of claim 1 in which said captive ring includes an opening extending along an axis, said captive ring including a base extending axially with respect to said axis and a leg extending radially with respect to said axis, said leg being interposed between said outer coupler flange and said valve flange.

4. The coupling assembly of claim 1 in which said captive ring is T-shaped in cross-section.

5. The coupling assembly of claim 1 in which said captive ring is snapped around said valve coupler and is freely movable with respect to each of said valve flange and said valve coupler.

6. The coupling assembly of claim 1 in which said valve coupler includes a second end in which a valve is securely coupled to said second end.

7. The coupling assembly of claim 1 in which said captive ring is made from a material which is resistant to plastic flow under compressive forces.

8. The coupling assembly of claim 1 in which said captive ring is loaded onto said valve coupler after said valve flange is inserted over said outer coupler flange to retain said valve flange on said valve coupler.

9. The coupling assembly of claim 1 further comprising a gasket that is non-conductive and is configured to be interposed between said outer coupler flange and the line flange.

10. The coupling assembly of claim 1 in which said first mating surface and said outer coupler flange are substantially aligned and configured to interface with a planar gasket.

11. The coupling assembly of claim 1 in which said outer coupler flange has a non-circular outer periphery with different diametrical measurements, facilitating installation of said valve flange over said outer coupler flange when an axis of said valve flange is not coincident with an axis of said valve coupler.

12. The coupling assembly of claim 11 in which said non-circular outer periphery includes a plurality of flats.

13. An electrolysis-resistant coupling assembly for a valve within a fluid line configured for connection with a line flange, the coupling assembly comprising:
   a valve flange having a first mating surface and having an aperture extending therethrough, wherein said valve flange is configured to be aligned with and face the line flange for coupling thereto;
   a valve coupler having one end provided with an outer coupler flange configured to be aligned with and face the line flange for coupling thereto; and
   a substantially non-compressible, electrically non-conductive captive ring, said captive ring includes an opening therethrough extending along an axis, said captive ring including a base extending axially with respect to said axis, said captive ring including a leg extending radially with respect to said axis, said leg being interposed between said outer coupler flange and said valve flange, and said captive ring including a retention barb extending radially outward from said base, said retention barb configured to retain said valve flange in alignment with said captive ring.

14. The coupling assembly as in claim 13 in which said captive ring includes an opening having a diameter that is less than both an outer diameter of said outer coupler flange and an outer diameter of said inner coupler flange, said captive ring is split to facilitate positioning of said ring between said outer coupler flange and said inner coupler flange.

15. The coupling assembly of claim 13 in which said captive ring is loaded onto said valve coupler after said valve flange is inserted over said outer coupler flange to retain said valve flange on said valve coupler.

16. The coupling assembly as in claim 13 in which said captive ring extends along an entire axial length of said valve flange between said valve flange and said valve coupler.

17. The coupling assembly as in claim 13 in which the captive ring provides complete separation between the valve flange and the valve coupler.

18. An electrolysis-resistant coupling assembly for a valve within a fluid line configured for connection with a line flange, the coupling assembly comprising:
 a valve flange, said valve flange having a first mating surface and an aperture extending therethrough, said aperture having a first bore and a second bore, said second bore being larger than said first bore forming a lip spaced from said first mating surface;
 a valve coupler, said valve coupler having one end provided with an outer coupler flange and an inner coupler flange, said flanges extending radially outwardly from said valve coupler proximate said one end and being arranged in axially spaced relation thereon;
 a substantially non-compressible, electrically non-conductive captive ring extending at least partially circumferentially around said valve coupler and being positioned between said outer coupler flange and said inner coupler flange such that said captive ring provides complete separation between the valve flange and the valve coupler, said captive ring having a base extending axially and a leg extending radially outward from the base, the leg being interposed between said lip and said outer coupler flange of said valve coupler; and
 an interconnect element configured to interconnect said valve flange and said line flange and holding said lip against said captive ring and said out coupler flange.

19. The coupling assembly as in claim 18 in which said captive ring is made from a substantially rigid material, such that said captive ring substantially retains a shape when engaged to said valve coupler and said valve flange.

20. The coupling assembly of claim 18 in which said valve coupler includes a second end in which a valve is securely coupled to said second end.

21. The coupling assembly of claim 18 in which said captive ring is made from a material which is resistant to plastic flow under compressive forces.

22. The coupling assembly of claim 18 in which said first mating surface and said outer coupler flange are substantially aligned and configured to interface with a planar gasket.

23. An electrolysis-resistant coupling assembly for a valve within a fluid line configured for connection with a line flange, the coupling assembly comprising:
 a valve flange, said valve flange having a first mating surface and an aperture extending therethrough;
 a valve coupler, said valve coupler having one end provided with an outer coupler flange and an inner coupler flange, said flanges extending radially outwardly from said one end and being arranged in axially spaced relation thereon; and
 a substantially non-compressible, electrically non-conductive captive ring extending at least partially circumferentially around said valve coupler and being positioned between said outer coupler flange and said inner coupler flange, said captive ring extending along an entire axial length of said valve flange between said valve flange and said valve coupler to provide a physical barrier between said valve flange and said valve coupler, said captive ring includes an opening having a diameter that is less than both an outer diameter of said outer coupler flange and an outer diameter of said inner coupler flange, said captive ring is split to facilitate positioning of said ring between said outer coupler flange and said inner coupler flange.

24. The coupling assembly as in claim 23 in which said captive ring is made from a substantially rigid material, such that said captive ring substantially retains a shape when engaged to said valve coupler and said valve flange.

25. The coupling assembly as in claim 23 in which said captive ring has a base extending axially between said valve flange and said valve coupler for at least a portion of a length of said valve flange, and said captive ring having a leg extending radially outward from the base, the leg being interposed between said valve flange and said outer coupler flange of said valve coupler.

26. An electrolysis-resistant coupling assembly for a valve within a fluid line configured for connection with a line flange, the coupling assembly comprising:
 a valve flange, said valve flange having a first mating surface and an aperture extending therethrough;
 a valve coupler, said valve coupler having one end provided with an outer coupler flange and an inner coupler flange, said flanges extending radially outwardly from said one end and being arranged in axially spaced relation thereon; and
 a substantially non-compressible, electrically non-conductive captive ring extending at least partially circumferentially around said valve coupler and being positioned between said outer coupler flange and said inner coupler flange, said captive ring includes a base, a leg extending outward from said base, and a retention barb extending radially outward from said base and spaced apart from said leg, said retention barb and said leg cooperating to retain said valve flange in alignment with said captive ring, said captive ring being positioned between said valve flange and said valve coupler to provide a physical barrier between said valve flange and said valve coupler, said captive ring includes an opening having a diameter that is less than both an outer diameter of said outer coupler flange and an outer diameter of said inner coupler flange, said captive ring is split to facilitate positioning of said ring between said outer coupler flange and said inner coupler flange.

\* \* \* \* \*